United States Patent
Kratochwill et al.

(10) Patent No.: US 7,530,281 B2
(45) Date of Patent: May 12, 2009

(54) GEAR SET FOR DIFFERENTIAL GEAR SHAFTS OF AN INTERNAL COMBUSTION ENGINE

(75) Inventors: Helmut Kratochwill, Steyr (AT); Walter Reisinger, Schwertberg (AT); Reinhard Ratzberger, Steyr (AT); Guenter Bachner, Steyr (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/926,595

(22) Filed: Oct. 29, 2007

(65) Prior Publication Data
US 2008/0053259 A1 Mar. 6, 2008

Related U.S. Application Data

(63) Continuation of application No. 09/715,043, filed on Nov. 20, 2000, now abandoned.

(30) Foreign Application Priority Data
Nov. 18, 1999 (DE) ................. 199 55 474

(51) Int. Cl.
*F16H 55/12* (2006.01)
(52) U.S. Cl. .......................................... 74/409; 74/401
(58) Field of Classification Search .................. 74/401, 74/409, 440
See application file for complete search history.

(56) References Cited

U.S. PATENT DOCUMENTS

| | | | | |
|---|---|---|---|---|
| 2,075,995 A | * | 4/1937 | Morgan | 74/434 |
| 3,913,988 A | * | 10/1975 | Scales et al. | 384/95 |
| 5,540,112 A | * | 7/1996 | Baker et al. | 74/409 |
| 5,743,145 A | * | 4/1998 | Terada et al. | 74/409 |
| 6,126,319 A | * | 10/2000 | Toyota et al. | 384/43 |
| 2002/0146326 A1 | * | 10/2002 | Kawaguchi et al. | 417/223 |

FOREIGN PATENT DOCUMENTS

| | | |
|---|---|---|
| DE | 650 754 | 9/1937 |
| DE | 883379 | 7/1953 |
| DE | 1180 596 | 10/1964 |
| DE | 2020 722 | 11/1971 |
| DE | 4428999 | 2/1996 |
| DE | 197 50 286 A1 | 5/1999 |
| EP | 0942200 | 9/1999 |
| JP | 56024257 | 3/1981 |
| JP | 58-165591 | * 9/1983 |
| JP | 59126074 | 7/1984 |
| JP | 1-164814 | * 6/1989 |

OTHER PUBLICATIONS

"Handbook of Gears, D190" by Stock Drive Products and Sterling Instrument, 1995, pp. T45-T47.*

(Continued)

*Primary Examiner*—William C Joyce
(74) *Attorney, Agent, or Firm*—Crowell & Moring LLP

(57) ABSTRACT

A gear set for differential shafts of internal combustion engines. The gear set includes a toothed wheel which can be moved parallel to its axis for adjustment of backlash. A spacer is arranged removably between tooth faces of interacting teeth of engaging toothed wheels and serves to adjust the backlash between the toothed wheels. The spacer is arranged free of play between corresponding tooth faces of the toothed wheels by way of the movable toothed wheel which can be moved with a predetermined force to the other toothed wheels.

7 Claims, 2 Drawing Sheets

OTHER PUBLICATIONS 4 sheets of Form PTO-892 and 2 sheets of Form PTO-1449 from prior application.
Brochure: 13 Hoffman Werkzeuge "Inhaltsübersicht" (1981).
Brochure: 20 DAMPF Modell-Spezial 58, 62 (1992).
G. Niemann et al., II Maschinen-elemente (2) 365, 368.
International Search Report for EP 00 12 1831 (dtd Mar. 23, 2001).
International Search Report.

* cited by examiner

GEAR SET FOR DIFFERENTIAL GEAR SHAFTS OF AN INTERNAL COMBUSTION ENGINE

This application is a continuation of U.S. patent application Ser. No. 09/715,043, filed Nov. 20, 2000, the entire disclosure of which is incorporated herein by reference, which in turn claims the priority of German application DE 199 55 474.9, filed Nov. 18, 1999.

BACKGROUND AND SUMMARY OF THE INVENTION

The invention concerns a gear set. In particular, the present invention relates to a gear set for differential gear shafts of internal combustion engines. The gear set includes at least one first toothed wheel, which is rotatable around an axle fixed to a housing and meshes with a second toothed wheel which can be moved parallel to its axis during assembly in order to adjust backlash.

It is known that backlash, more particularly circumferential backlash, serves to form a hydrodynamic lubrication, to compensate for mass changes as a result of temperature influences, for tooth deformation resulting from stress, and for manufacturing and assembly errors.

Thus known from DE-B 1 180 596, for example, is a gear set with a device for setting the backlash in which conical toothed wheels are shifted axially in opposition to each other depending on certain parameters of the gear set, and thus the backlash can be set depending, for example, on rotational speed, temperature, or load.

In a further backlash adjustment in spur-wheel gears with axially movable wheels it is provided according to DE-OS 2 020 722 that the teeth are to be configured so as to be wedge-shaped so that backlash can be set with an axial movement of one wheel.

Further known from DE-PS 883 379 is a rack and toothed-wheel-segment gear set in which in one of the end positions, a spacer similar to a tooth face is provided at least on one tooth face in order to eliminate backlash.

From the German textbook *Maschinenelemente* (Machine elements), Vol. II, 2nd edition, by Niemann and Winter, page 365 and following, it is further known that by copper plating the teeth of a toothed wheel, backlash can be brought for practical purposes to zero.

Finally, it is known, by way of example, as a frequent suggestion for a backlash adjustment according to DE-PS 650 754 to bear one of the shafts of the meshing toothed wheels in an adjustable eccentric bushing which is fixed relative to the housing upon realization of the desired backlash.

Finally, eccentric elements also serve in the gear set for differential gear shafts of an internal combustion engine according to DE 197 50 286 A1, whereby in order to adjust backlash between a first, crankshaft-side toothed wheel and an intermediate wheel or a second wheel which is born in a bearing frame of the differential gear shaft and which already meshes with a drive wheel of the differential gear shaft, it is provided that the bearing frame is arranged so as to be movable and fixable for setting backlash by means of eccentric elements relative to the remaining machine housing. With this arrangement, backlash can be set only between two toothed wheels.

The object of the invention is to provide, for a gear set of the type described above, a relatively simple adjustment of backlash without repeated measurement of the backlash with purposeful movement of a wheel shaft on the one hand and without an expensive mechanical device on the other.

This object is achieved in the present invention by the use of a spacer which is removably arranged between the tooth faces of interfacing teeth of the meshing toothed wheels which serves the purpose of adjusting the backlash. Since the second toothed wheel can be adjusted with a predetermined force to the first toothed wheel, the spacer can be arranged without play between corresponding tooth faces of the toothed wheels.

With the invention, pairs of toothed wheels of a gear set can be adjusted in advantageous manner with respect to play.

According to the various embodiments of the present invention, the spacer can be a film of a synthetic or a metal, and a film-like thin wire mesh appears also to be suitable. In addition, the spacer can be configured as a layer of a galvanically deposited solid lubricant which is abraded off during operation of the gear set. The spacer can also be formed by means of spring tabs which are arranged on one side in the tooth spaces and which, fastened to a strap, form a comb strip. The thickness of the spacer at a given time, supplied in a tooth gap on two sides or on one side, is preferably selected such that a total circumferential backlash of 20 μm to 120 μm is achieved.

Other objects, advantages and novel features of the present invention will become apparent from the following detailed description of the invention when considered in conjunction with the accompanying drawings.

BRIEF DESCRIPTION OF THE DRAWINGS

The invention is described with the aid of examples depicted in the drawings.

FIG. 3 shows a comb strip with spring tabs for inserting on one side into tooth spaces of teeth of toothed wheels which are engaging with each other.

DETAILED DESCRIPTION OF THE DRAWINGS

Figure 1:
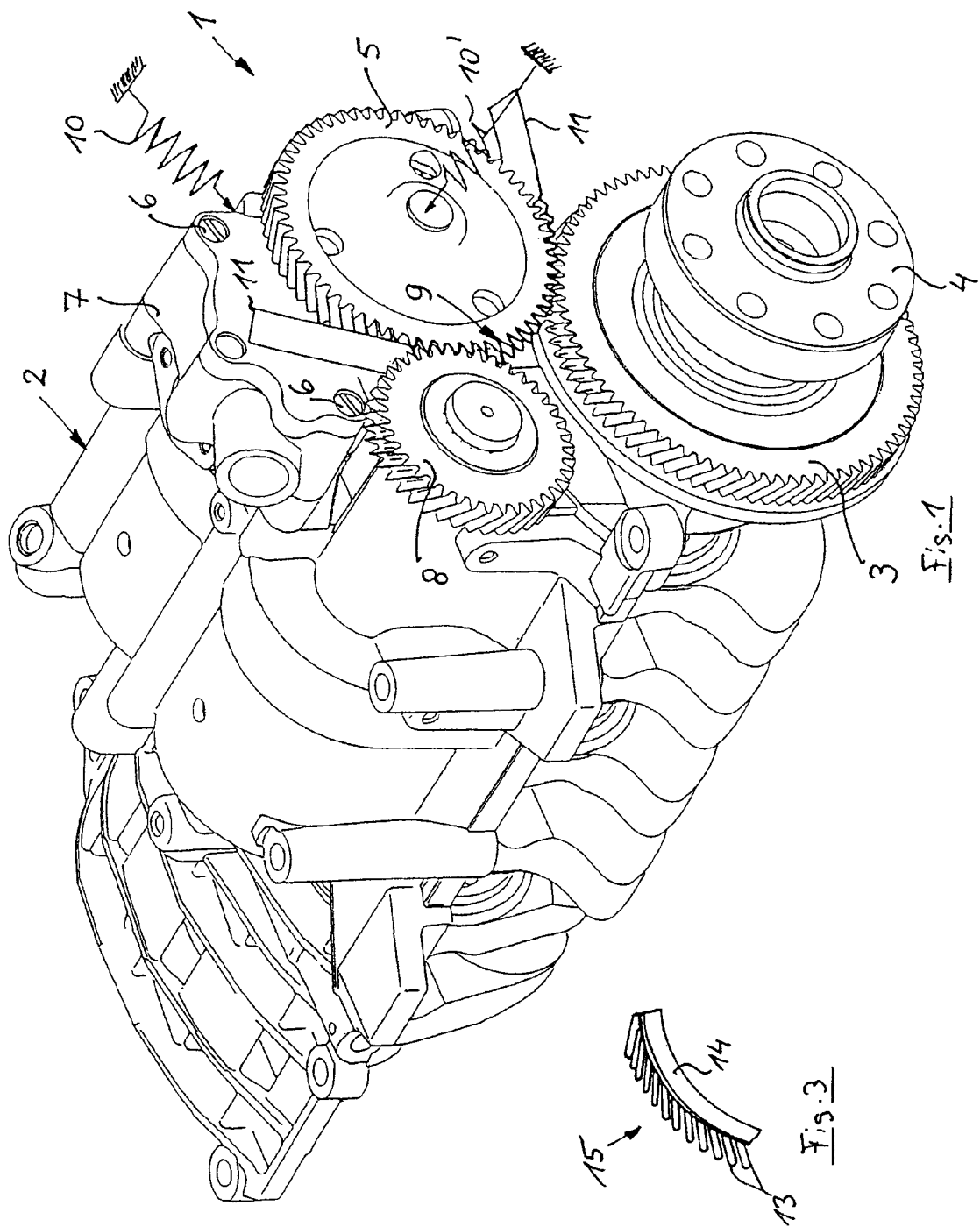
FIG. 1 shows a gear set for differential gear shafts of an internal combustion engine with a film between meshing toothed wheels as spacer.

A gear set 1 for a differential gear shaft device 2 of an internal combustion engine which is not depicted in detail comprises a first toothed wheel 3, which can rotate around an axle fixed to the housing, on a crankshaft 4 of the internal combustion engine. Meshing with the crankshaft/toothed wheel 3 is a second toothed wheel 5 which serves to drive a pump 7 which can be moved within limits during assembly and can be fixed afterwards by means of threaded bolts 6. As can be further seen from FIG. 1, the second toothed wheel 5 serves as an intermediate wheel for a third toothed wheel 8 for driving not-depicted differential gear shafts in the differential gear shaft device 2.

Adjustment in accordance with the invention of the backlash between the three meshing toothed wheels 3, 5, and 8 is accomplished in accordance with the invention through a spacer 9 arranged removably between tooth faces of engaging teeth of meshing toothed wheels 3, 5, 8. This spacer 9, according to the invention, which is described in greater detail below, is arranged without play between corresponding tooth faces of toothed wheels 3, 5, 8 by means of second toothed wheel 5, which can be adjusted with respect to first and third toothed wheels 3, 8 with a predetermined force according to a spring bias 10 which is effective when pump 7 is loosely arranged.

Spacer 9 according to the invention is configured as a separate synthetic, elastomeric, or metallic film. As can be seen in FIG. 1, the particular film can be configured as a strip 11, whereby a synthetic strip 11 is formed from polymer and a metallic film strip 11 preferably is formed of aluminum foil. Strip 11, which serves as spacer, can furthermore also be configured from a foil-thin wire mesh, for example rust-free stainless steel wire mesh (Nirosta).

In any case, the strip 11 of the particular foil material, which is introduced manually or by means of a robot, has a length such that it can serve for simultaneous backlash adjustment both in the meshing zone of toothed wheels 5 and 8 and also in the meshing zones of toothed wheels 5 and 3.

Figure 2:
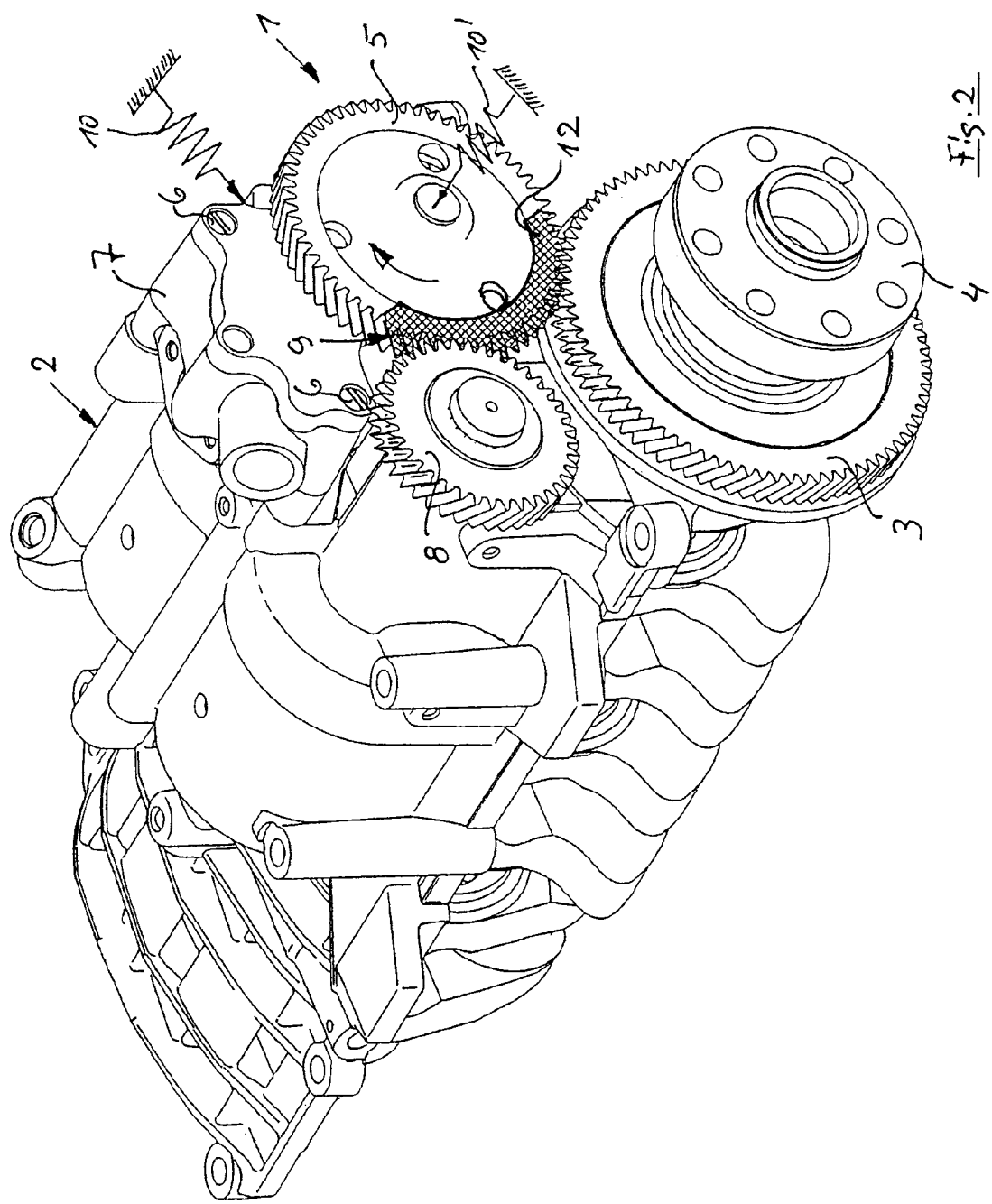
FIG. 2 shows a gear set for differential gear shafts of an internal combustion engine with a spacer formed as a molded part from a film or a wire mesh.

As can be seen in FIG. 2, in place of strip 11 as spacer 9, it can also be configured on a molded part 12, whereby foil 12 can be configured from one of the aforementioned foils or from a wire mesh or from a combination of two materials.

In another, not depicted but easily imagined, configuration of spacer 9 it is formed on one of toothed wheels 3, 5, 8 as a coating of solid lubricant which advantageously is deposited galvanically on at least one of toothed wheels 3, 5, 8 to achieve a uniform thickness of spacer 9. Through abrasion of this solid lubricant during operation of gear set 1, the desired backlash is obtained.

According to a further configuration of the invention, spring tabs 13 can be arranged in the meshing zone of toothed wheels 3, 5, 8 between mutually adjacent tooth faces whereby the spring tabs 13 which can be arranged in the pairs of teeth merely on one side in the same direction form a comb strip 15 provided on a strap 14. With the comb strip 15, a spacer 9 is achieved which acts on one side in the tooth gaps. For a total circumferential backlash of 20 μm to 120 μm, the spring tabs 13 of comb strip 15 can be of a corresponding thickness.

For the spacer 9 described earlier of an appropriate foil, a wire mesh, or a galvanically applied layer, the spacer 9 which rests upon both faces of a tooth and/or on opposite faces of a tooth gap can have a thickness of 10 μm to 60 μm for a total circumferential backlash of 20 μm to 120 μm. These thicknesses particularly apply to the contact points on the reference diameter of toothed wheels 3, 5, 8, whereby these thicknesses are achieved by means of a force device acting laterally on the easily removed pump 7 with spring bias 10.

In order to increase the accuracy of adjustment, in the case of helically toothed spur wheel gears 1, an axially directed force component 10' can be additionally provided acting on the still loosely arranged pump 7.

In order to achieve a zero backlash with applied spacer 9, toothed wheels 3, 5, 8 are turned slightly back and forth and following fixing of pump 7 by means of threaded devices 6, the particular spacer 9 is screwed out of the spur wheel gear set 1.

In the framework of the invention, second toothed wheel 5 can also be borne in a not-depicted end plate so as to be capable of being moved parallel to its axis.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Gear set for differential shafts of an internal combustion engine comprising:
   at least one first toothed wheel which is rotatable around an axle fixed to a housing and meshing with a second toothed wheel which is movable parallel to its rotation axis during assembly;
   wherein a spacer is formed of spring tabs forming a comb strip and is arranged removably between tooth faces of the meshing toothed wheels to adjust the backlash;
   wherein by means of the second toothed wheel which can be advanced with a predetermined force to the first toothed wheel, the spacer is arranged without play between corresponding tooth faces of the toothed wheels.

2. Gear set according to claim 1, wherein the second toothed wheel is arranged between the first toothed wheel and a third toothed wheel for differential shafts of the internal combustion engine, the second toothed wheel, which drives a pump being movable during assembly and fixable after assembly, the second toothed wheel being operable as an intermediate wheel,
   wherein the spacer is arranged and configured at least over two meshing zones of the gear set, and the spacer is forced laterally into meshing contact without play by a force device with the first and the third toothed wheel.

3. Gear set according to claim 2, wherein the gear set is a helically toothed spur wheel gear set, and an axially oriented force component acts additionally on the pump of the internal combustion engine.

4. The gear set according to claim 1, wherein the second toothed gear wheel is arranged between the first toothed gear wheel and a third toothed gear wheel having a tooth face, and the spacer is arranged removably and without play between the tooth faces of the first, second and third toothed gear wheels by way of the movable second toothed gear wheel for adjusting the backlash between the gear wheels.

5. A gear set for differential shafts of internal combustion engines comprising:
   a first toothed gear wheel having a tooth face and being rotatable around an axle rotatably fixed to a housing; and
   a second toothed gear wheel having a tooth face and meshing with the first toothed gear wheel along the respective tooth faces, the second toothed gear wheel having a rotation axis and being movable parallel to its rotation axis during assembly; and
   a spacer, wherein said spacer is formed of spring tabs forming a comb strip and is arranged removably and without play between the tooth faces of the gear wheels by way of the movable second toothed gear wheel for adjusting the backlash between the gear wheels.

6. A method of adjusting a backlash between gear wheels of a gear set of an internal combustion engines comprising:
   providing a first toothed gear wheel having a tooth face and being rotatable around an axle rotatably fixed to a housing; and
   providing a second toothed gear wheel having a tooth face and meshing with the first toothed gear wheel along the respective tooth faces, the second toothed gear wheel having a rotation axis and being movable parallel to its rotation axis during assembly; and providing a spacer between the tooth faces of the gear wheels, wherein the spacer is made of spring tabs forming a comb strip; and moving the second toothed gear wheel against the first toothed gear wheel to mesh the gear wheels along their respective tooth faces and to arrange the spacer removably and without play between the tooth faces of the gear wheels for adjusting the backlash between the gear wheels.

7. The method of claim 6, wherein moving the second toothed gear wheel includes moving the second toothed gear wheel against a third toothed gear wheel having a tooth face, to arrange the spacer removably and without play between the tooth faces of the first, second and third gear wheels for adjusting the backlash between the gear wheels.

* * * * *